US011591006B2

(12) United States Patent
Lingemann (10) Patent No.: US 11,591,006 B2
(45) Date of Patent: Feb. 28, 2023

(54) STEERING APPARATUS FOR A VEHICLE HAVING AN IMPACT ABSORPTION DEVICE

(71) Applicant: ZF Automotive Germany GmbH, Alfdorf (DE)

(72) Inventor: Markus Lingemann, Bochum (DE)

(*) Notice: Subject to any disclaimer, the term of this patent is extended or adjusted under 35 U.S.C. 154(b) by 0 days.

(21) Appl. No.: 17/366,858

(22) Filed: Jul. 2, 2021

(65) Prior Publication Data
US 2022/0017139 A1    Jan. 20, 2022

(30) Foreign Application Priority Data
Jul. 20, 2020    (DE) .......................... 102020209027.0

(51) Int. Cl.
*B62D 1/19* (2006.01)
*B62D 1/183* (2006.01)

(52) U.S. Cl.
CPC .............. *B62D 1/197* (2013.01); *B62D 1/183* (2013.01); *B62D 1/195* (2013.01)

(58) Field of Classification Search
CPC . B62D 1/18; B62D 1/183; B62D 1/19; B62D 1/195; B62D 1/197
See application file for complete search history.

(56) References Cited

U.S. PATENT DOCUMENTS

| 8,919,220 | B2* | 12/2014 | Moriyama | B62D 1/197 |
| | | | | 280/775 |
| 2006/0290128 | A1* | 12/2006 | Ridgway | B62D 1/195 |
| | | | | 280/779 |
| 2016/0001809 | A1* | 1/2016 | Kingston-Jones | B62D 1/195 |
| | | | | 74/492 |
| 2016/0368525 | A1* | 12/2016 | Chiba | B62D 1/195 |
| 2018/0354546 | A1* | 12/2018 | Kreutz | B62D 1/195 |
| 2022/0153336 | A1* | 5/2022 | Beham | F16B 19/08 |

* cited by examiner

*Primary Examiner* — Laura Freedman
*Assistant Examiner* — Daniel M. Keck
(74) *Attorney, Agent, or Firm* — Kristin L. Murphy (57) ABSTRACT

The disclosure relates to a steering apparatus for a vehicle having an impact absorption device for absorbing an impact force introduced via a steering wheel. The steering apparatus has a fastening device for fastening to a vehicle carrier or a vehicle body. The fastening device has a bracket for holding a steering column. The bracket has at least one connecting portion for connecting to the fastening device by a fastening element. At least one target breaking portion is designed to break starting from a predetermined impact force. In order to simplify the construction and/or to be able to realize production more economically, the bracket has and/or forms the target breaking portion, with the connecting portion being separated from the bracket after breaking the target breaking portion and remaining on the fastening device.

18 Claims, 11 Drawing Sheets

Fig. 11

# STEERING APPARATUS FOR A VEHICLE HAVING AN IMPACT ABSORPTION DEVICE

CROSS-REFERENCE TO RELATED APPLICATION

This application claims priority to German Patent Application No. 102020209027.0 filed Jul. 20, 2020, the disclosure of which is incorporated herein by reference in its entirety.

TECHNICAL FIELD

The disclosure relates to a steering apparatus for a vehicle having an impact absorption device for absorbing an impact force introduced via a steering wheel. The disclosure further relates to a fastening device for fastening to a vehicle carrier or a vehicle body, having a bracket for holding a steering column, the bracket having at least one connecting portion for connecting to the fastening device, wherein at least one target breaking portion is designed to break starting from a predetermined impact force.

BACKGROUND

A steering apparatuses are known from EP 3 572 299 A1. According to this publication, a fastening device and a bracket have holes which merge into one another in an assembled state and are cast using a plastics material. By means of these plastics material pins thus formed and the bracket is held on the fastening device in normal use. In an accident situation that deviates from normal use, a driver of the vehicle can hit the steering wheel, in particular a triggered airbag on the steering wheel. In the event of a sufficiently large impact force introduced as a result, the plastics material pins break, which are thus designed as a target breaking portion. This arrangement already absorbs impact energy. In addition, the bracket is now released from the fastening device and the bracket with the steering column can move relative to the fastening device or shift in a predetermined manner. The steering column is preferably designed telescopically so that in the event of an accident in which the driver of the vehicle is thrown onto the steering wheel, it can be pushed together and the steering wheel can move together with the driver.

The disadvantage in this case is that the formation of a target breaking portion from plastics material or by means of an injection molding process causes a high level of effort in the production and/or in ensuring a sufficiently firm connection between the bracket and the fastening device in normal use.

What is needed is to further develop a steering apparatus of the type mentioned above in such a way that the construction is simplified and/or production can be implemented more cost-effectively. For example, arrangements that permit dispensing with complex injection molding of a target breaking portion would be desirable.

SUMMARY

A steering apparatus is disclosed. The steering apparatus is designed for a vehicle, such as a motor vehicle. In particular, the steering apparatus has a steering wheel. The steering wheel of the steering apparatus is operably connected to running wheels of the vehicle. In this case, the running wheels can be moved or aligned by the steering apparatus and by turning the steering wheel. This allows for a driver to control a direction of travel while the vehicle is in motion.

The steering apparatus has an impact absorption device for absorbing an impact force introduced via the steering wheel. More specifically, the impact absorption device makes it possible to better protect a driver of the vehicle from injuries in the event of an accident. In the event of an accident situation, in particular in the event of a frontal crash, the driver can be thrown onto the steering wheel and/or onto a triggered airbag of the steering wheel. As a result, the impact force can be introduced into the steering apparatus and the impact absorption device via the steering wheel.

In one exemplary arrangement, the steering apparatus has a fastening device. The fastening device is designed for fastening to a vehicle carrier or a vehicle body of the vehicle. The vehicle carrier can be designed as a vehicle cross member. The fastening device may be fastened to the vehicle carrier or the vehicle body in the region of a dashboard or instrument panel. In one exemplary arrangement, the fastening device is fastened to the vehicle carrier or the vehicle body in such a way that a relative movement between the fastening device and the vehicle carrier or the vehicle body is prevented.

The steering apparatus has a bracket for holding a steering column. In particular, the steering wheel is arranged on the steering column. The steering column can be adjustable in terms of inclination and/or height and/or length. This allows the position of the steering wheel to be adjusted to the height or ergonomics of the driver. The bracket has at least one connecting portion for connecting to the fastening device by a fastener. In particular, the bracket is not fastened directly to the vehicle carrier or the vehicle body with the interposition of the fastening device. More specifically in the exemplary arrangement, the connection of the bracket to the fastening device is secured and/or fixed by the fastener. The fastener may be designed as a screw, a bolt, or a rivet.

The steering apparatus has at least one target breaking portion which is designed to break from a predetermined impact force. In one exemplary arrangement, the steering column and/or the bracket is released from the fastening device after the breaking of the target breaking portion. For example, after breaking the target breaking portion, a predetermined pushing together of the steering apparatus and/or the steering column, in particular in relation to the fastening device and/or away from the fastening device, is made possible. The bracket has the target breaking portion and/or forms the target breaking portion. In such an arrangement, the connecting portion is separated from the bracket after breaking the target breaking portion. After breaking the target breaking portion, the connecting portion remains on the fastening device.

The advantage with the disclosed arrangement is that the construction and/or production of the impact absorption device and/or the target breaking portion is simplified. In particular, a more economical implementation is made possible. Furthermore, according to this exemplary arrangement of this solution, the use of plastics material and/or an injection molding process for producing the target breaking portion can be dispensed with.

The bracket may be designed integrally with the connecting portion and the target breaking portion. In such an exemplary arrangement, the bracket can be made of a metal and/or be formed from a sheet metal material. This considerably simplifies the production of the impact absorption device and/or the target breaking portion. The fastening device can also be formed from a metal and/or a sheet metal material.

According to a further exemplary arrangement, the connecting portion is designed to be plate-like. The bracket and the connecting portion may have the same material thickness. In particular, the bracket and the connecting portion may be formed from the same material as a component of the bracket. In one exemplary arrangement, the bracket has two connecting portions. The two connecting portions can be arranged or formed to be mirror-symmetrically to one another. Furthermore, the two connecting portions can be arranged on two sides of the bracket that are arranged facing away from one another. The steering column is arranged or is configured to be arranged between the two connecting portions. To hold or arrange the steering column, the bracket can have a U-shaped or substantially U-shaped portion. For example, the Li-shaped portion is arranged between the two connecting portions. The U-shaped portion can be designed as an integral or one-piece component of the bracket. Alternatively, the U-shaped portion can be designed as a separate or independent component that is connected to the bracket by a suitable fastening element and/or material bonding, for example by welding. In particular, the U-shaped portion provides a first leg flange and a further leg flange for arranging or fastening the steering column.

According to a further exemplary arrangement, the bracket is formed from a single semi-finished product or sheet metal element with the connecting portion and the target breaking portion. In such an arrangement, the bracket, the connecting portion and/or the target breaking portion can be produced or formed by a forming and/or punching operation. Such processing or production is comparatively inexpensive and can be implemented with sufficient tolerances.

According to a further exemplary arrangement, the target breaking portion is designed as a web-like connection to the connecting portion. The design of the target breaking portion as a web-like connection can be produced in a simple and/or inexpensive manner. By providing a suitably selected contour of the web-like connection, in particular with regard to a width and/or length of the web-like connection, a breaking property of the target breaking portion can be set with regard to a predetermined impact force. More specifically, the target breaking portion has a smaller material thickness than the connecting portion and/or the bracket. In this case, the lower material thickness of the target breaking portion can result due to material processing. Thus, a single semi-finished product or sheet metal element can continue to serve as the starting material for forming the bracket with the connecting portion and the target breaking portion, a smaller material thickness resulting, however, for the target breaking portion due to subsequent material processing, in particular forming, punching, and/or embossing than for the connecting portion and/or the bracket.

In one exemplary arrangement, the bracket has at least one gap. The gap can be formed by a punching operation. The target breaking portion bridges the gap. The gap determines the contour of the connecting portion. In one exemplary arrangement, the connecting portion and/or the target breaking portion results from the formation of the gap. The bracket can have two or at least two target breaking portions assigned to a single connecting portion. A first target breaking portion can, in particular with reference to a plan view, extend parallel to a central longitudinal axis of the steering apparatus. A further target breaking portion can, in particular with reference to a plan view, extend transversely or at right angles to a central longitudinal axis of the steering apparatus. The gap can be designed to be L-shaped or substantially L-shaped. In such an arrangement, the first target breaking portion can be arranged in a first leg and the further target breaking portion can be arranged in a further leg of the gap. Alternatively, the gap can be designed to be C-shaped or substantially C-shaped.

According to a further exemplary arrangement, the fastening device has a receptacle. The connecting portion of the bracket is arranged and/or clamped in the receptacle. In particular, the fastening device and/or the receptacle has a first contact surface and a second contact surface. In this arrangement, the connecting portion of the bracket is arranged and/or clamped between the first contact surface and the second contact surface. In particular, the contact surfaces form friction surfaces for the connecting portion. Due to the contour of the first contact surface and/or the second contact surface and/or due to the clamping force between the contact surfaces and the connecting portion, the force required to break the target breaking portion and/or to detach the bracket from the fastening device in an accident situation can be set and/or influenceable. In particular, planes of the two contact surfaces are aligned parallel to an extension direction with regard to the detachment of the bracket from the fastening device when breaking the target breaking portion. The first contact surface, the second contact surface, and the connecting portion preferably have a through opening in each case for passing through the fastening element. In particular, the fastening element extends at right angles to the plane of the contact surfaces.

According to a further exemplary arrangement, the fastening device is formed from a single semi-finished product or sheet metal element, in particular by a forming and/or punching operation. In one exemplary arrangement, the fastening device has a first receptacle and a second receptacle on two side end portions of the fastening device facing away from one another in each case for arranging or clamping a connecting portion. For example, in one exemplary arrangement, the fastening device preferably has a first contact surface and a second contact surface on two side end portions of the fastening device facing away from one another in each case for arranging or clamping a connecting portion. The two side end portions of the fastening device can be designed mirror-symmetrically to one another. In particular, the steering column of the steering apparatus is arranged between the two side end portions of the fastening device.

The first contact surface and the second contact surface are formed by two components for forming the fastening device. The two components for forming the fastening device can be formed from two independent semi-finished products or sheet metal elements, such as by a forming and/or punching operation. To form the fastening device, the two components can be connected to one another by a fastening element or material bonding, for example by a welding operation.

In one exemplary arrangement, a first component of the fastening device has a first contact surface in each case on two side end portions facing away from one another and in each case a second plate-like component, which is not directly connected to the first component, for providing the second contact surface. This results in a fixation of the second plate-like component due to the fastening element with which the second plate-like component is connected to the first component via the clamping of the connecting portion between the first contact surface and the second contact surface. In particular, a receptacle for the connecting portion is thereby formed at the same time. Alternatively, a second component joined, for example, welded, to the first component can have two second contact surfaces, in particular for forming two receptacles.

According to a further exemplary arrangement, the bracket and/or the connecting portion provide friction surfaces which interact with the first contact surface and the second contact surface of the fastening device. As already explained above, in this way the force required to detach the bracket from the fastening device or to break the target breaking portion can be adjusted and/or influenced.

More specifically, the first contact surface and/or the second contact surface may have a rectangular or rectangular-like side edge contour. Alternatively, the first contact surface and/or the second contact surface can have a side edge contour that tapers towards an end face of the contact surface. In particular, the side edge contour tapers in the extension direction, which results from the detachment of the bracket from the fastening device in an accident situation. The tapering side edge contour results in an, in particular continuous, reduction in the frictional forces between the contact surfaces and the bracket after breaking the target breaking portion and/or during the detachment of the bracket from the fastening device. In one exemplary arrangement, a contour of a gap in the bracket that forms the connecting portion corresponds to the side edge contour of the first contact surface and/or the second contact surface. The first contact surface and the second contact surface can completely contact the connecting portion of the bracket. More specifically, the first contact surface and/or the second contact surface cover and/or bridge the gap in the bracket. Thus, the first contact surface and/or the second contact surface can contact an edge portion of the bracket facing the connecting portion. In particular, the edge portion of the bracket is defined or formed by the gap. The target breaking portion bridges the gap between the connecting portion and the edge portion of the bracket.

BRIEF DESCRIPTION OF THE DRAWINGS

The disclosure is explained in more detail below with reference to the drawings. In this case, like reference signs relate to like, similar, or functionally identical components or elements. In the drawings.

DETAILED DESCRIPTION

Figure 1:
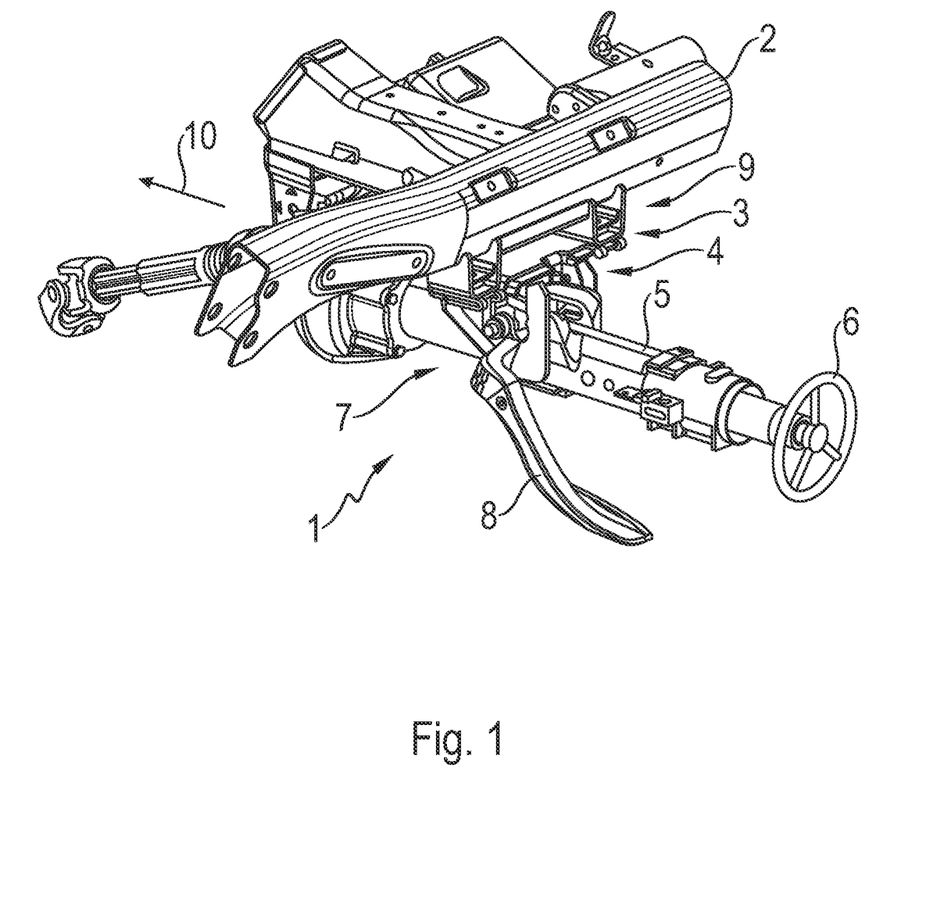
FIG. 1 is a perspective side view of a steering apparatus according to the disclosure on a vehicle carrier.

FIG. 1 shows a perspective side view of a steering apparatus 1 according to the disclosure on a vehicle carrier 2. In this exemplary arrangement, the vehicle carrier 2 is designed as a vehicle cross member. The steering apparatus 1 has a fastening device 3 with which the steering apparatus 1 is fastened to the vehicle carrier 2. The steering apparatus 1 also has a bracket 4. The bracket 4 is connected to the fastening device 3. In this arrangement, the bracket 4 holds a steering column 5 of the steering apparatus 1. A steering wheel 6 (only shown schematically here) can be arranged at a free end of the steering column 5.

In this exemplary arrangement, the steering apparatus 1 has an adjustment mechanism 7, The adjustment mechanism 7 includes, inter ilia, a lever 8, The adjustment mechanism 7 allows the steering column 5 and thus the steering wheel 6 to be adjusted with regard to an inclination and/or height thereof. In addition, the length of the steering column 5 can be adjusted by the adjustment mechanism 7. To adjust the inclination and/or height and/or length, the adjustment mechanism 7 is released by the lever 8. After adjusting the desired inclination and/or height and/or length has been set, the adjustment mechanism 7 is fixed or blocked by the lever 8.

The steering apparatus 1 has an impact absorption device 9. The impact absorption device 9 is designed to absorb an impact force introduced via the steering wheel 6. For example, in an accident situation or due to a crash, a driver of a vehicle is thrown with the steering apparatus 1 in the direction of and onto the steering wheel 6 or onto an airbag (not shown here) that is arranged and triggered on the steering wheel 6. As a result, the impact force is introduced into the steering apparatus 1 via the steering wheel 6. The impact absorption device 9 allows for a yielding or displacement of the steering column 5 with the steering wheel 6 in an extension direction according to arrow 10 from a predetermined impact force. In this exemplary arrangement, the extension direction according to arrow 10 is oriented substantially parallel to a longitudinal extension of the steering column 5. Furthermore, in this exemplary arrangement, the extension direction is directed according to arrow 10 starting from the steering wheel 6 in the direction of the vehicle carrier 2.

Figure 2:
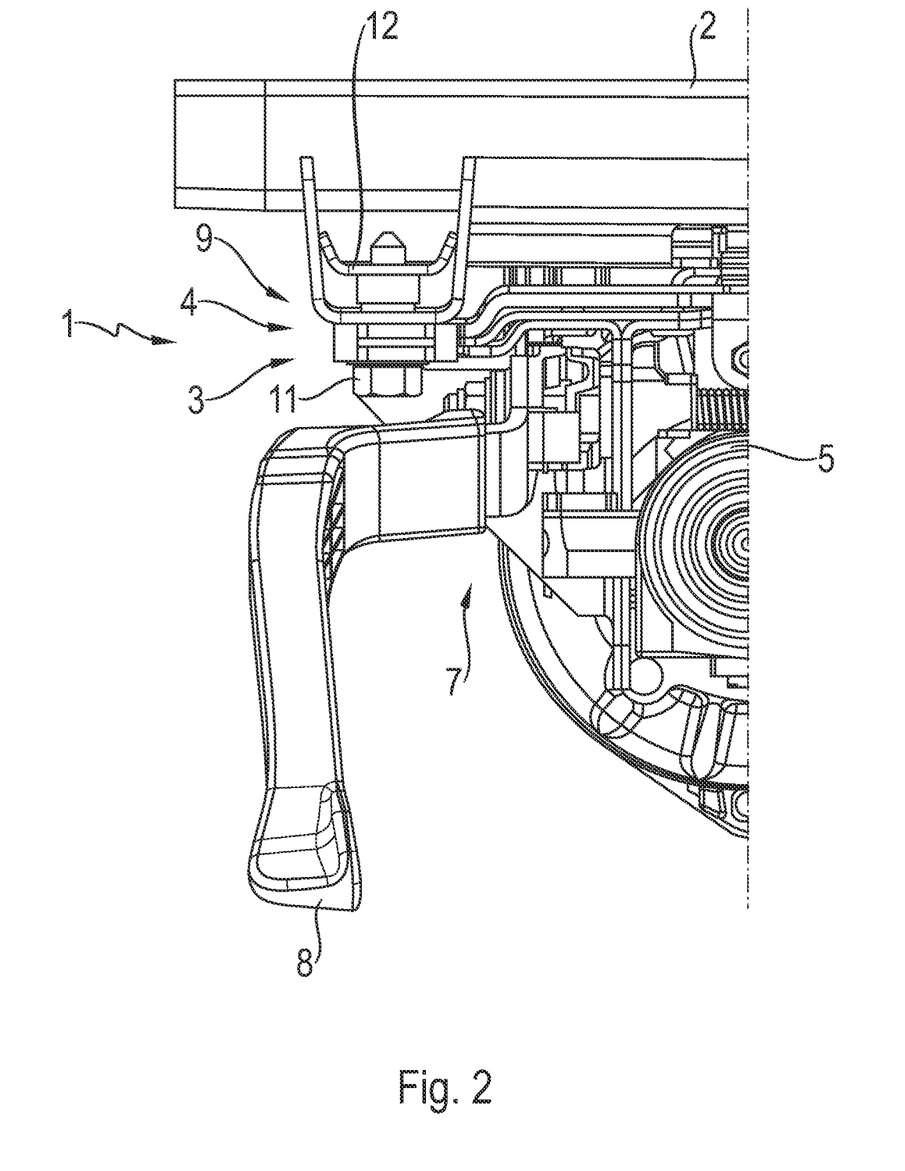
FIG. 2 is a section of a front view of the steering apparatus according to the arrangement of FIG. 1 on the vehicle carrier.

FIG. 2 shows a detail of a front view of the steering apparatus 1 according to the arrangement shown in FIG. 1 on the vehicle carrier 2. The bracket 4 is connected to the fastening device 3 by a fastening element 11. In one exemplary arrangement, the fastening element 11 may be a screw. In this arrangement, the fastening element 11 is screwed into a counterpart 12. The counterpart 12 is designed as a kind of nut.

As can also be seen from FIG. 1, the bracket 4 in this exemplary arrangement is connected with a total of two fastening elements 11 to the fastening device 3 and via this in turn to the vehicle carrier 2.

The structure and the mode of operation of the fastening device 3 and the bracket 4 are described in more detail with reference to the following drawings.

Figure 3:
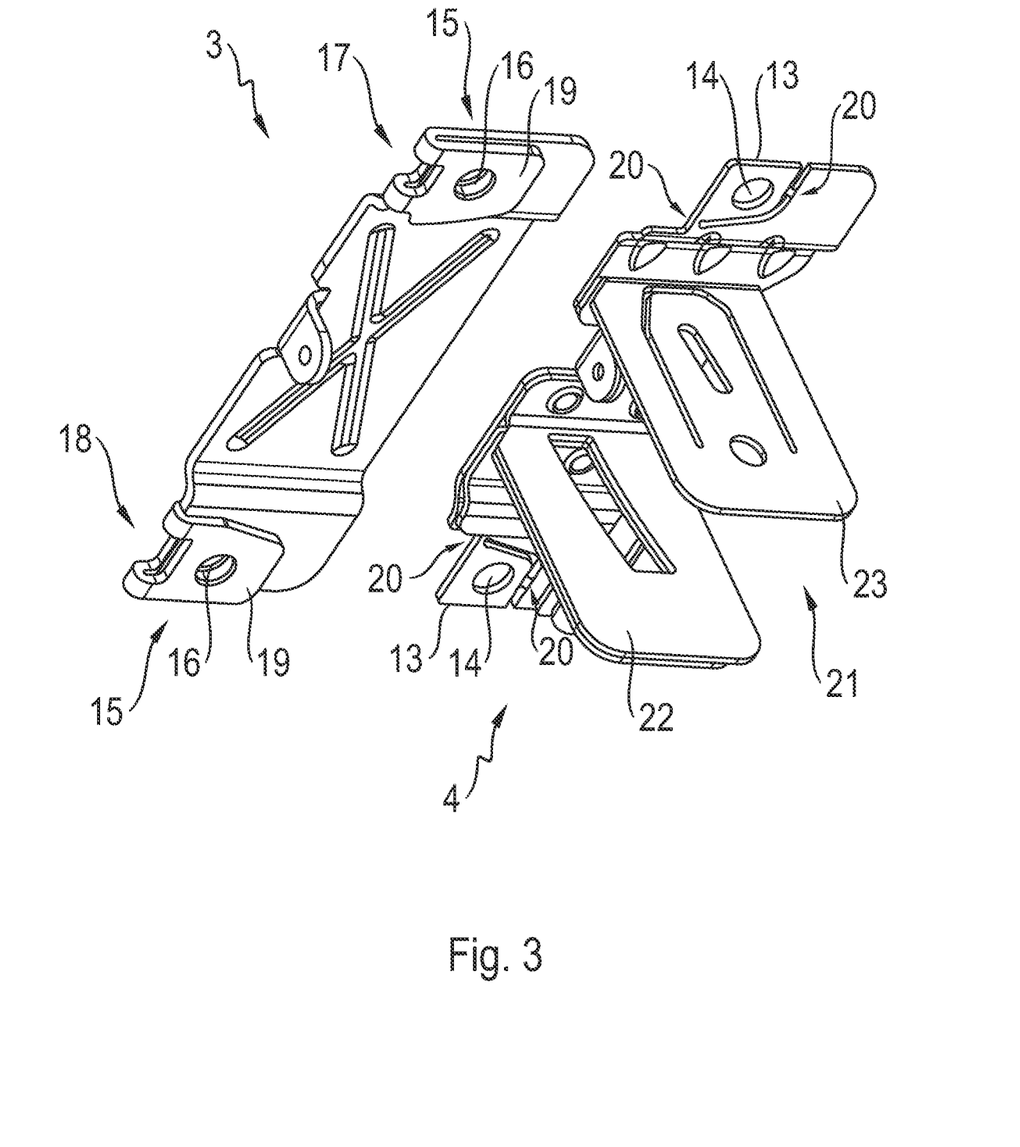
FIG. 3 is a perspective side view of a fastening device and a bracket in a mutually unassembled state.

FIG. 3 shows a perspective side view of the fastening device 3 and the bracket 4 in a mutually unassembled state. In this exemplary arrangement, the bracket 4 has two connecting portions 13. Each connecting portion 13 has a through opening 14 for passing through the fastening element 11 according to FIG. 2. The connecting portions 13 serve to connect the bracket 4 to the fastening device 3. For this purpose, in one exemplary arrangement, the fastening device 3 has two receptacles 15. In each case, an individual receptacle 15 is designed to receive an individual connecting portion 13. The receptacles 15 each have a through opening 16 for passing through the fastening element 11 according to FIG. 2.

In this exemplary arrangement, the fastening device 3 is formed from a single semi-finished product, namely a sheet metal element, by a forming and punching operation. In the exemplary arrangement depicted, the two receptacles 15 are formed on two side end portions 17, 18 of the fastening device 3 facing away from one another. The fastening device 3 can thus be produced completely from metal in a comparatively simple manner. The fastening device 3 or the side end portions 17, 18 are designed substantially to be plate-like. In this arrangement, the receptacle 15 is formed by a tab 19. In this arrangement, the tab 19 is bent over by 180° to align it parallel to the side end portion 17 or 18.

In this arrangement, the bracket 4 has a plurality of target breaking portions 20. The target breaking portions 20 are designed to break from a predetermined impact force. In this arrangement, the bracket 4 is formed integrally with the connecting portions 13 and the target breaking portions 20 and is formed from a metal, namely a sheet metal material. Furthermore, the connecting portions 13 are designed to be plate-like. In addition, the bracket 4 and the connecting portions 13 thereof have the same material thickness in this arrangement. In this exemplary arrangement, this results in a simple manner from the fact that the bracket 4 is formed from a single semi-finished product or a single sheet metal element with the connecting portions 13 and the target breaking portions 20 by a forming and punching operation.

In this exemplary arrangement, the bracket 4 has a substantially U-shaped portion 21. According to FIG. 1, the steering column 5 can be arranged within the U-shaped portion 21. In this case, the steering column 5 can be fastened in a suitable manner with the U-shaped portion 21 and, in this arrangement, when implementing the adjustment mechanism 7. In this exemplary arrangement, the U-shaped portion 21 is implemented as a separate component of the bracket 4, which is firmly connected to the bracket 4 in a suitable manner. Due to its shape as a U-shaped portion 21, this portion has a first leg flange 22 and a further leg flange 23.

Figure 4:
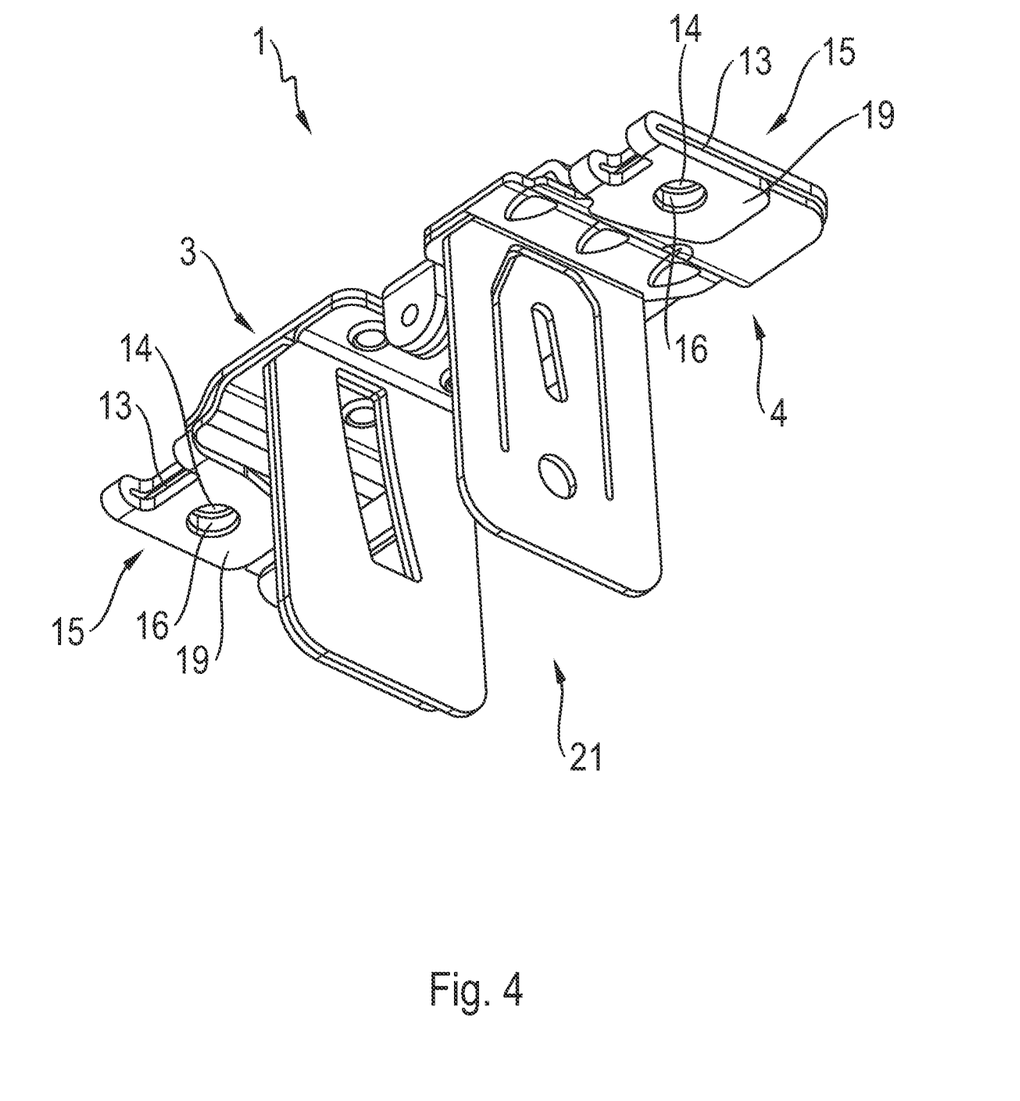
FIG. 4 is a perspective side view of the steering apparatus according to the disclosure without a steering column.

FIG. 4 shows a perspective side view of the steering apparatus 1 according to an exemplary arrangement without the steering column 5. In other words, the fastening device 3 and the bracket 4 are shown here in a preassembled state. In the preassembled state shown, the connecting portions 13 of the bracket 4 are pushed into the receptacles 15 in such a way that the through openings 14, 16 are arranged in alignment with one another. This allows for the fastening element 11 according to FIG. 2 to be guided through, and thus to be fastened to the vehicle carrier 2.

Figure 5:
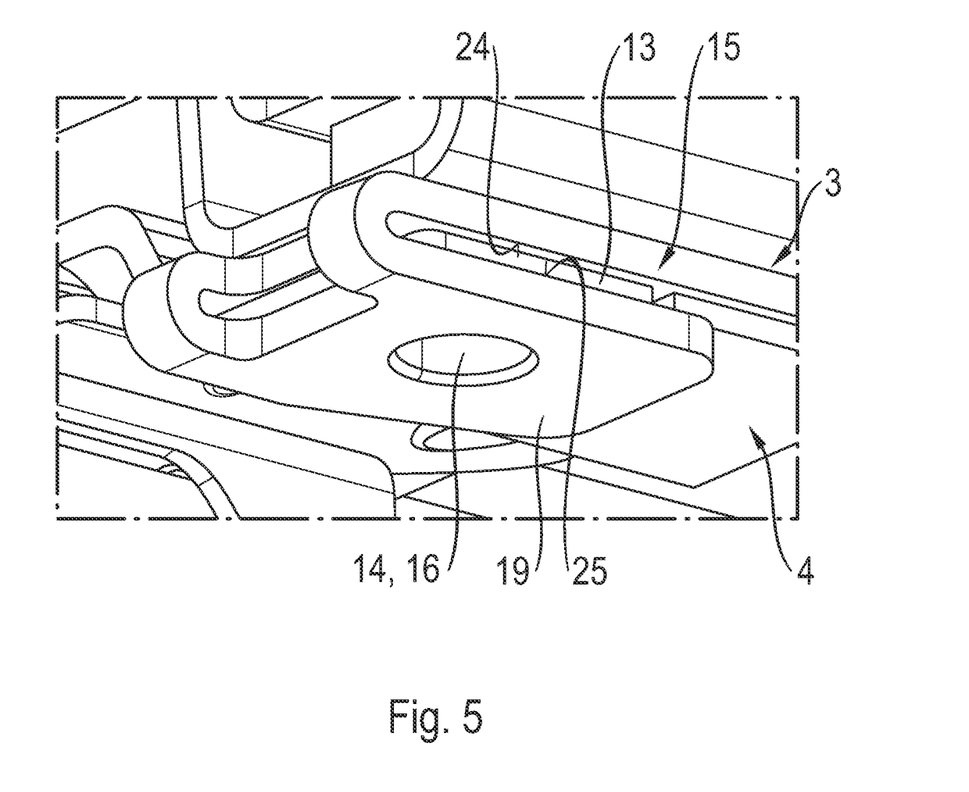
FIG. 5 is a section of a perspective side view of the steering apparatus according to the disclosure.

FIG. 5 shows a detail of a perspective side view of the steering apparatus 1 according to an exemplary arrangement. The fastening device 3 has a first contact surface 24 and a second contact surface 25. In this arrangement, the two contact surfaces 24, 25 are formed or provided by the receptacle 15. In this case, the connecting portion 13 is arranged and/or damped between the first contact surface 24 and the second contact surface 25. Correspondingly, the two contact surfaces 24, 25 face one another. Furthermore, the two contact surfaces 24, 25 are aligned parallel to one another. In this case, the two contact surfaces 24, 25 are spaced apart from one another in such a way that the connecting portion 13 is arranged in a clamping manner between the two contact surfaces 24, 25. The surfaces of the bracket 4 and the connecting portion 13, which interact with the first contact surface 24 and the second contact surface 25, also form friction surfaces.

Figure 6:
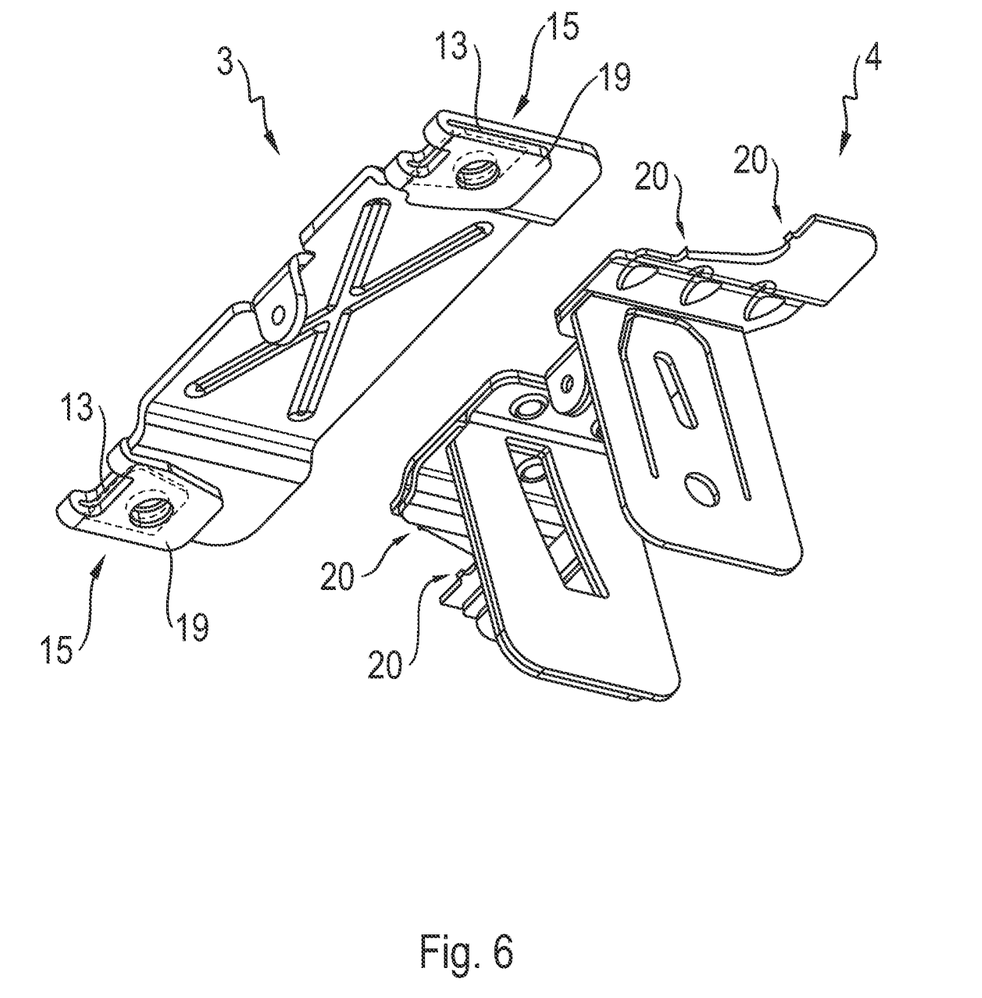
FIG. 6 is a perspective side view of the fastening device and the bracket after breaking a target breaking portions.

FIG. 6 shows a perspective side view of the fastening device 3 and the bracket 4 after breaking the target breaking portions 20. If, in the case of a steering apparatus 1 assembled according to FIGS. 1 and 2, a sufficiently large impact force is introduced into the steering apparatus 1 via the steering wheel 6, breaking of the target breaking portions 20 takes place. As a result, the bracket 4 and the steering column 5 connected to the bracket 4 are released from the fastening device 3 and thus also from the vehicle carrier 2 shown in FIGS. 1 and 2. As a result, the steering column 5 can be moved together with the bracket 4 and the steering wheel 6 in the extension direction according to arrow 10, see FIG. 1. Due to the interaction of the two contact surfaces 24, 25, the connecting portion 13, and the fastening element 11, the connecting portion 13 remains on the fastening device 3 after breaking the target breaking portions 20, as shown in this case.

Figure 7:
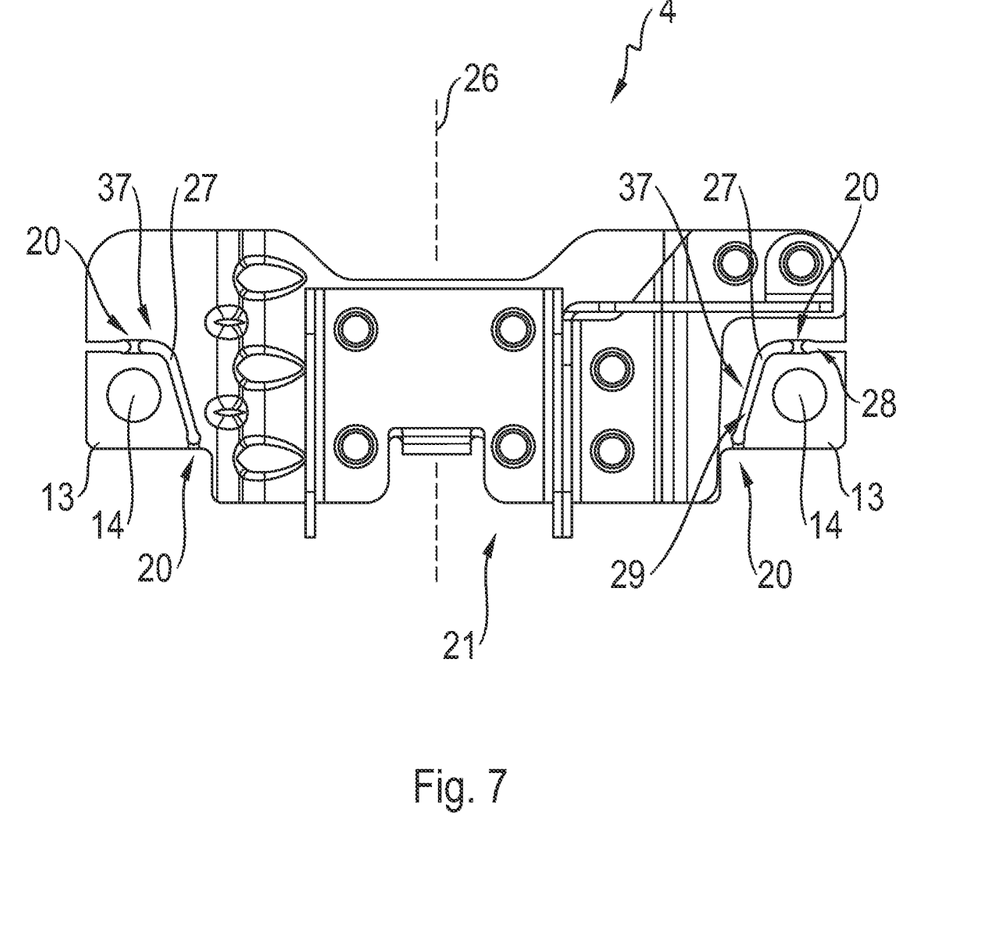
FIG. 7 is a top view of the bracket.

FIG. 7 shows a plan view of the bracket 4. In this exemplary arrangement, two target breaking portions 20 are assigned to each connecting portion 13. In this case, the target breaking portion 20 is implemented as a web-like connection to the connecting portion 13. Furthermore, in this arrangement, the target breaking portions 20 have a smaller material thickness than the connecting portion 13 or the rest of the bracket 4 due to material processing. One of the two target breaking portions 20 of the respective connecting portion 13 is in this case, for example, aligned parallel to a central longitudinal axis 26 of the steering apparatus 1, in particular in the plan view shown in this case. The central longitudinal axis 26 generally coincides with a central longitudinal axis of the steering column 5. In this arrangement, a second target breaking portion 20 of each connecting portion 13 is oriented transversely or at right angles to the central longitudinal axis 26.

In this arrangement, the bracket 4 has two gaps 27. The gaps 27 are formed by a punching operation. The target breaking portions 20 each bridge the gap 27. Here, the contour of the respective connecting portion 13 is determined by the design or the shape of the gap 27. In this arrangement, the gap 27 is substantially designed to be L-shaped. In this respect, the gap 27 can be divided into a first leg 28 and a further leg 29, which merge into one another. In this arrangement, the first target breaking portion 20 is assigned to the first leg 28 and the further target breaking portion 20 is assigned to the further leg 29.

The first contact surface 24 and the second contact surface 25 can completely contact the connecting portion 13 of the bracket 4 according to FIG. 4. According to this embodiment, the first contact surface 24 and the second contact surface 25 cover or bridge the gap 27 of the bracket 4. As a result, the first contact surface 24 and the second contact surface 25 according to FIG. 5 contact an edge portion 37 of the bracket 4 facing the connecting portion 13. This edge portion 37 is defined or formed by means of the gap 27. The target breaking portion 20 bridges the gap 27 between the connecting portion 13 and the edge portion 37.

Figure 8:
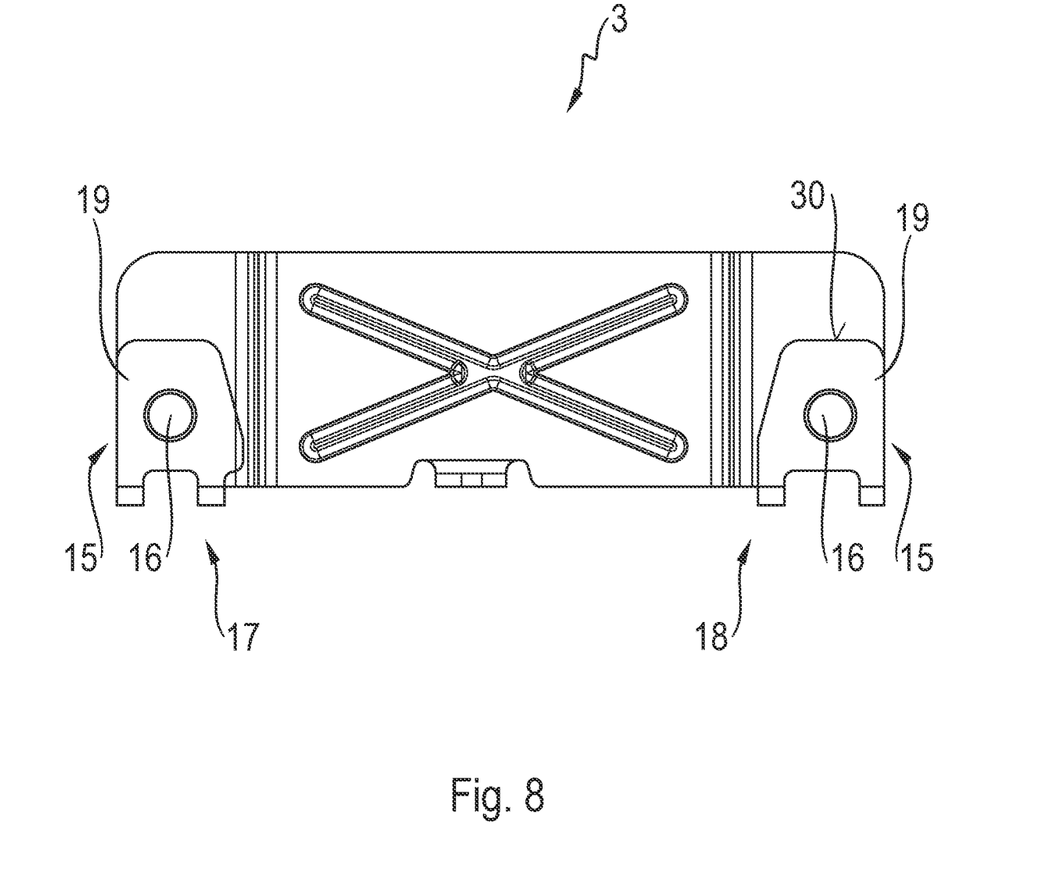
FIG. 8 is a top view of the fastening device.

FIG. 8 shows a plan view of the fastening device 3. In this arrangement, the tab 19 or the second contact surface 25 according to FIG. 5 has a side edge contour that tapers towards an end face 30 of the second contact surface 25, As a result, an effective friction surface between the bracket 4 and the fastening device 3 is continuously reduced after the breaking of the target breaking portions 20 and when moving in the extension direction according to arrow 1 in accordance with FIG. 1.

Figure 9:
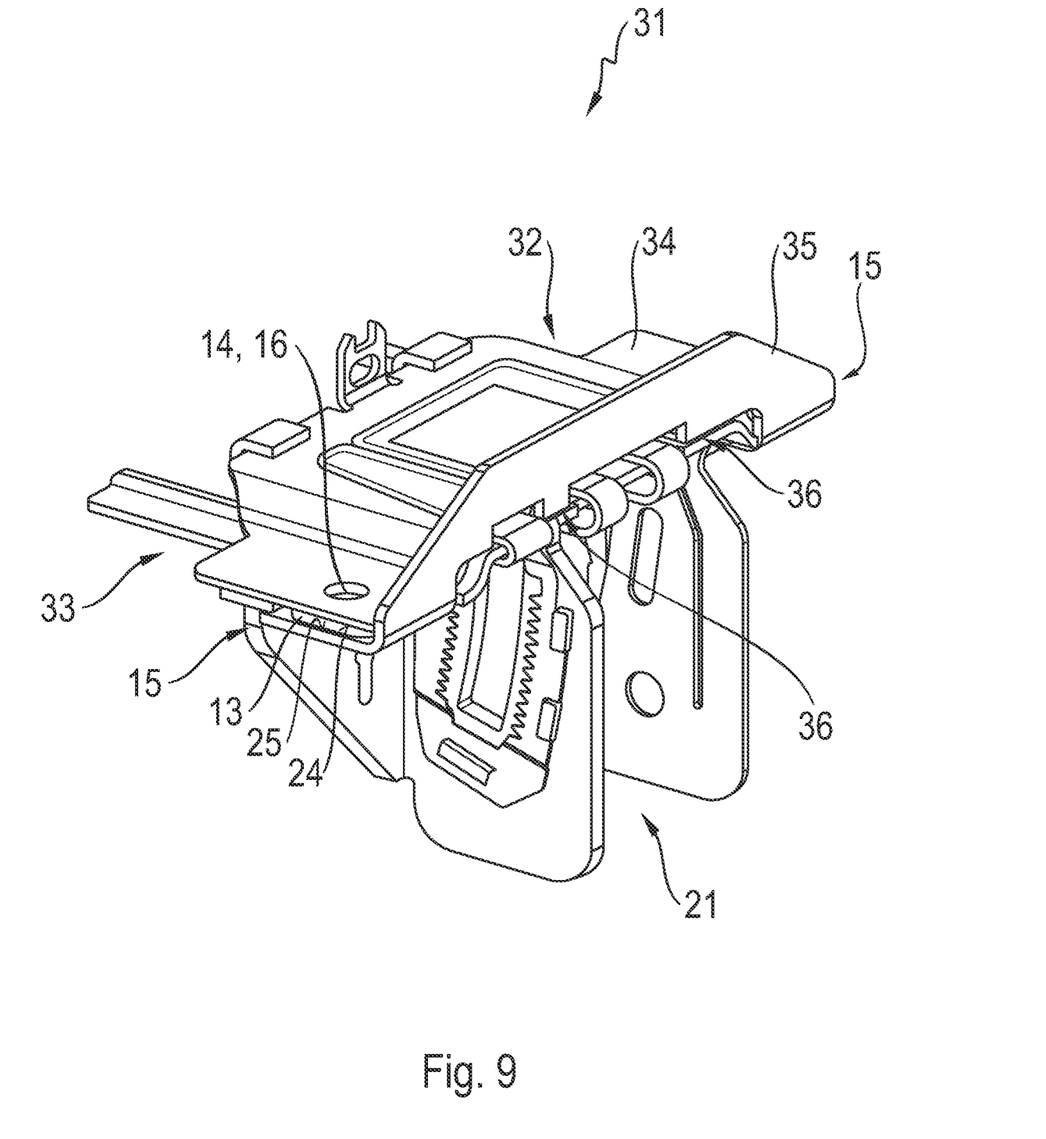
FIG. 9 is a perspective side view of a further steering apparatus according to the disclosure.

FIG. 9 shows a perspective side view of a further steering apparatus 31 according to an exemplary arrangement. The same features as before have the same reference signs. In this respect, reference is also made to the preceding description.

The steering apparatus 31 can be connected to the vehicle carrier 2 instead of the steering apparatus 1 according to FIG. 1. Furthermore, the steering apparatus 31 in the sense of the steering apparatus 1 can have a steering column 5 having a steering wheel 6. The steering apparatus 31 has a fastening device 32 and a bracket 33. In terms of structure and mode of operation, the bracket 33 largely corresponds to the bracket 4. In this respect, reference is also made to the preceding description in order to avoid repetition.

In terms of its mode of operation, the fastening device 32 also substantially corresponds to the fastening device 3. Unlike the fastening device 3, however, the fastening device 32 shown in this case is formed from two independent components 34, 35. In this case, the component 34 provides the first contact surface 24. The second component 35 provides the second contact surface 25. In this arrangement, the two components 34, 35 are joined to one another. This joining of the components 34, 35 is implemented in this case by way of example by welded connections 36.

Figure 10:
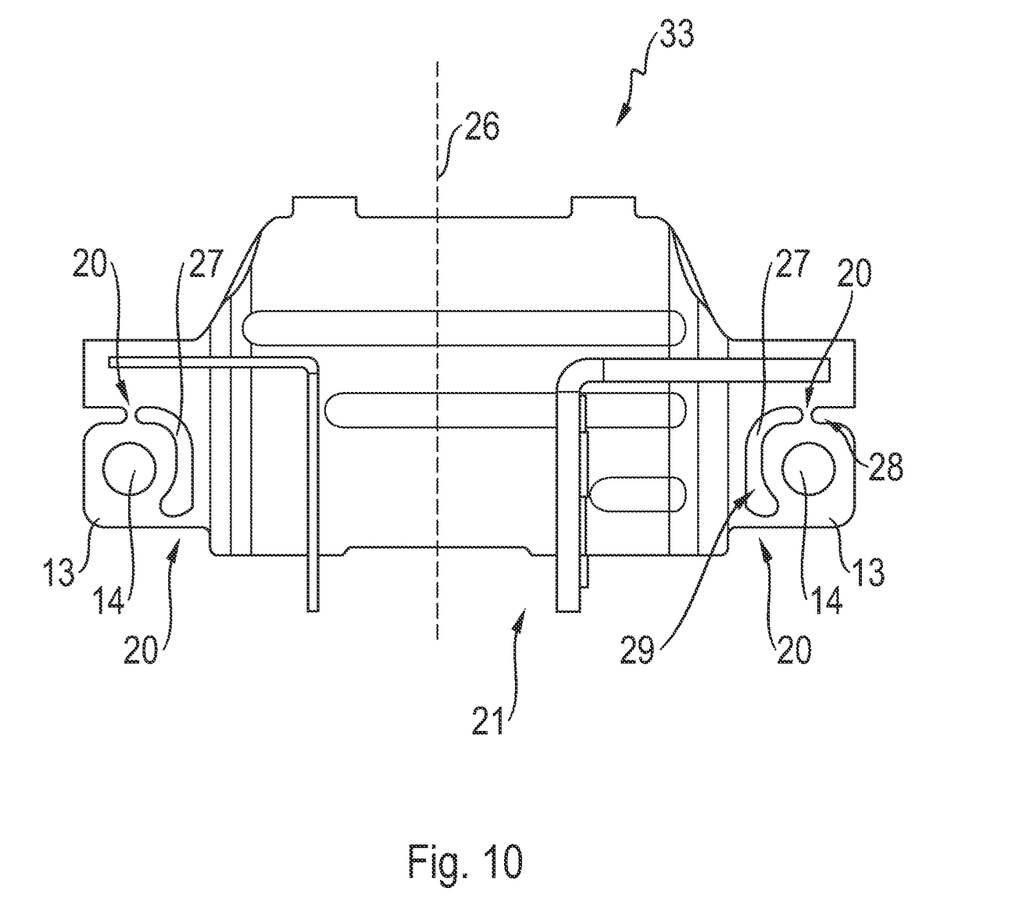
FIG. 10 is a plan view of a bracket for the further steering apparatus according to FIG. 9.

FIG. 10 shows a plan view of the bracket 33 for the further steering apparatus 31 according to FIG. 9. The gap 27 is substantially designed to be L-shaped. In this exemplary arrangement, the two legs 28, 29 of the gap 27 are arranged substantially at right angles to one another. The leg 29 is slightly C-shaped in this arrangement.

Figure 11:
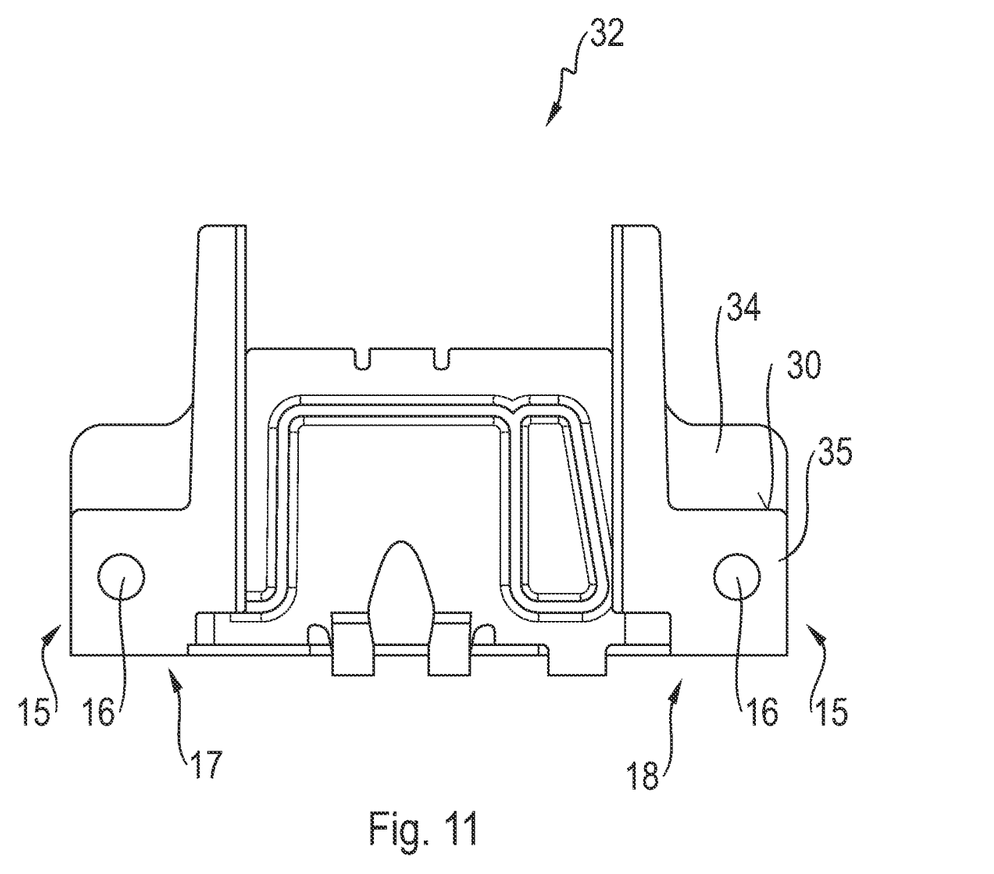
FIG. 11 is a plan view of a fastening device for the further steering apparatus according to FIG. 9.

FIG. 11 shows a plan view of the fastening device 32 for the further steering apparatus 1 according to FIG. 9, in contrast to the fastening device 3 according to FIG. 8, the second contact surface 25, taking into account FIGS. 9 and 11, does not have a contour that tapers towards the end face 30, but rather a rectangular or rectangular-like side edge contour.

What is claimed is:

1. A steering apparatus for a vehicle comprising: an impact absorption device for absorbing an impact force introduced via a steering wheel, a fastening device for fastening to a vehicle carrier or a vehicle body, a bracket for holding a steering column, wherein the bracket has at least one connecting portion for connecting to the fastening device by a fastening element and at least one gap, wherein at least two target breaking portions are designed to break starting from a predetermined impact force, wherein the target breaking portions bridge the at least one gap, wherein the bracket has and/or forms the target breaking portion, the connecting portion being separated from the bracket after breaking the target breaking portion and remaining on the fastening device.

2. The steering apparatus according to claim 1, wherein the bracket is formed integrally with the connecting portion and the target breaking portions and/or is formed from metal.

3. The steering apparatus according to claim 1, wherein the connecting portion has a plate construction, the bracket and the connecting portion having the same material thickness, and wherein the bracket has two connecting portions.

4. The steering apparatus according to claim 1, wherein the bracket is formed from a single semi-finished product or sheet metal element with the connecting portion and the target breaking portions.

5. The steering apparatus according to claim 1, wherein the target breaking portions are designed as web connections to the connecting portion and has a smaller material thickness than the connecting portion and/or the bracket.

6. The steering apparatus according to claim 5, wherein the target breaking portions are formed via a material processing operation.

7. The steering apparatus according to claim 1, wherein the fastening device has at least one receptacle the connecting portion being arranged and/or clamped in the receptacle, between a first contact surface and a second contact surface, the first contact surface, the second contact surface, and the connecting portion having a through opening for passing through the fastening element.

8. The steering apparatus according to claim 7, wherein the fastening device is formed from a single semi-finished product or sheet metal element by a forming and/or punching operation, the fastening device having a first receptacle and a second receptacle, the first and second receptacles being disposed on two side end portions, respectively, of the fastening device facing away from one another.

9. The steering apparatus according to claim 7, wherein the first contact surface and the second contact surface are formed by two components for forming the fastening device.

10. The steering apparatus according to claim 9, wherein a first component of the two components of the fastening device has the first contact surface disposed on two side end portions facing away from one another and a second plate component, which is not directly connected to the first component, for providing the second contact surface.

11. The steering apparatus according to claim 7, wherein the bracket and/or the connecting portion provide friction surfaces that interact with the first contact surface and the second contact surface of the fastening device, wherein the first contact surface and/or the second contact surface has a side edge contour, a contour of the gap in the bracket forming the connecting portion corresponding to the side edge contour.

12. The steering apparatus according to claim 11, wherein the side edge contour tapers toward an end face of one of the contact surfaces.

13. The steering apparatus according to claim 11, wherein the gap defines the contour of the connecting portion.

14. A steering apparatus for a vehicle comprising:
   an impact absorption device for absorbing an impact force introduced via a steering wheel;
   a fastening device for fastening to a vehicle carrier or a vehicle body the fastening device having a first contact surface and a second contact surface, wherein the first contact surface and the second contact surface are formed by two components; and
   a bracket for holding a steering column;
   wherein the bracket has at least one connecting portion for connecting to the fastening device by a fastening element;
   wherein a first component of the two components of the fastening device has the first contact surface disposed on two side end portions facing away from one another and a second plate component, which is not directly connected to the first component, for providing the second contact surface;
   wherein at least one target breaking portion is designed to break starting from a predetermined impact force;
   wherein the bracket has a target breaking portion, the target breaking portion designed as a web connection to the connecting portion,
   wherein the bracket has at least one gap, the target breaking portion bridging the gap; and wherein the connecting portion is separated from the bracket after breaking the target breaking portion and remaining on the fastening device.

15. The steering apparatus according to claim 14, wherein the target breaking portion has a smaller material thickness than the connecting portion and/or the bracket.

16. The steering apparatus according to claim 15, wherein the gap is formed by a punching operation.

17. The steering apparatus according to claim 14, wherein the fastening device has at least one receptacle, the connecting portion being arranged and/or clamped in the receptacle.

18. A steering apparatus for a vehicle comprising:
an impact absorption device for absorbing an impact force introduced via a steering wheel,
a fastening device for fastening to a vehicle carrier or a vehicle body, and
a bracket for holding a steering column,
wherein the bracket has at least one connecting portion for connecting to the fastening device by a fastening element,
wherein at least one target breaking portion is designed to break starting from a predetermined impact force,
wherein the bracket has and/or forms the target breaking portion, the connecting portion being separated from the bracket after breaking the target breaking portion and remaining on the fastening device wherein the fastening device has at least one receptacle, the connecting portion being arranged and/or clamped in the receptacle, between a first contact surface and a second contact surface, the first contact surface, the second contact surface, and the connecting portion having a through opening for passing through the fastening element;

wherein the first contact surface and the second contact surface are formed by two components for forming the fastening device, and wherein a first component of the two components of the fastening device has the first contact surface on two side end portions facing away from one another and a second component joined to the first component, wherein the second component has two second contact surfaces.

* * * * *